F. W. YOUNG,

Assignor to K. S. EVANS.

SEED DROPPER.

No. 10,197. Reissued Sept. 12, 1882.

Attest,
M. M. Converse.
Ira Converse

Inventor.
Frank W. Young.
B. C. Converse atty.

N. PETERS. Photo-Lithographer. Washington, D. C.

UNITED STATES PATENT OFFICE.

FRANK W. YOUNG, OF SANTA ROSA, CALIFORNIA, ASSIGNOR TO K. S. EVANS, OF SPRINGFIELD, OHIO.

SEED-DROPPER.

SPECIFICATION forming part of Reissued Letters Patent No. 10,197, dated September 12, 1882.

Original No. 142,320, dated August 26, 1873. Application for reissue filed January 28, 1882.

*To all whom it may concern:*

Be it known that I, FRANK W. YOUNG, a citizen of the United States, residing at Santa Rosa, in the county of Sonoma and State of California, have invented a new and useful Improvement in Seed-Droppers, of which the following is a specification.

My invention relates to a rotary seed-dropping device for planters, and is intended as an improvement upon the seed-dropper for which Letters Patent were granted to me February 11, 1873, and reissued August 5, 1873, Nos. 135,743 and 5,529, respectively.

My invention consists, first, in the construction and arrangement of the reciprocating slide-lever for rotating the dropping disk or wheel; second, in the construction and arrangement of the pawls pivoted to the slide, with their co-operative devices for guiding and retaining their engaging ends in contact with the teeth of the seed-disk during the movement of the latter when converting the reciprocating movement of the device into interrupted rotary motion; third, in the construction and arrangement of a stationary cut-off with the dropping-wheel, whereby the quantity of seed discharged by each cell in the dropping-disk is regulated with great accuracy.

Figure 1:
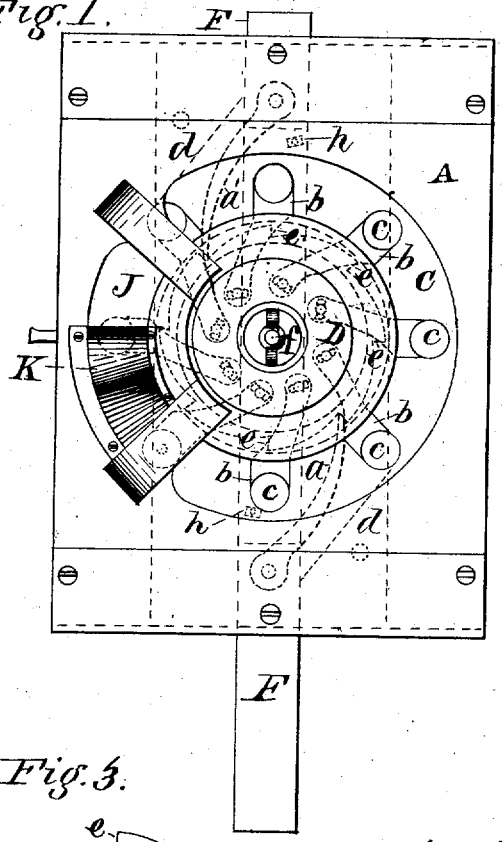
Figure 2:
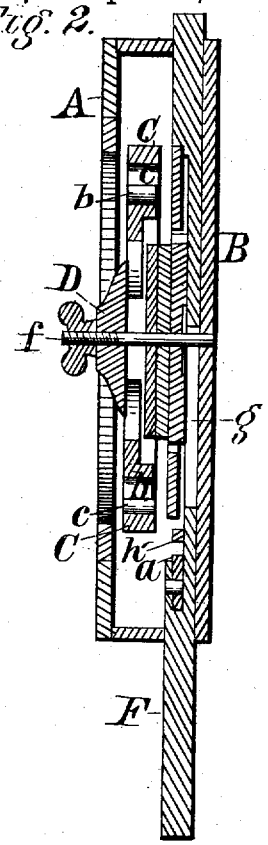
Figure 3:
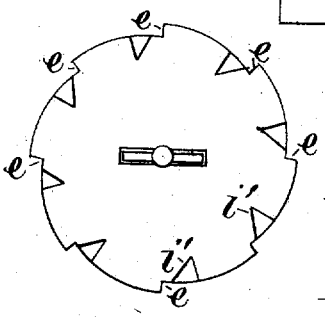
Figure 4:
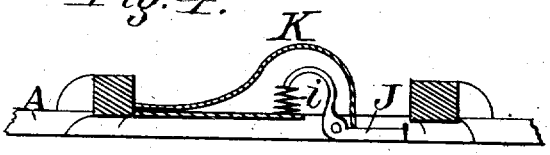
Figure 5:
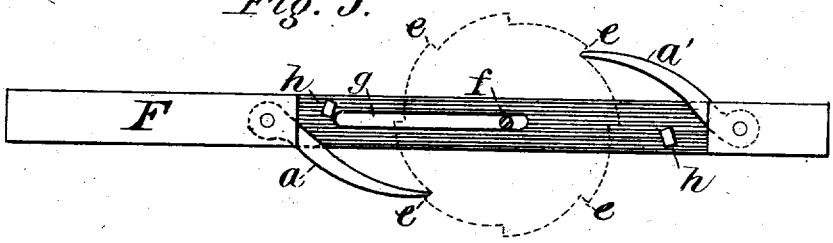

Figure 1 is a plan view of my improved seed-dropper. Fig. 2 is a longitudinal section through the middle line of the slide-lever. Figs. 3, 4, and 5 are detailed views.

The bottom is double, like that in my former patent, consisting of the two boards A and B, which constitute the bottom of a seed-hopper.

C represents the pivoted seed-wheel, which is provided with seed-holes *e* and adjustable arms *b*, slotted and pivoted to a disk or cap, D, on top of said wheel, by means of which they are adjusted. These several parts are constructed and arranged in the same manner as described in my patent above referred to.

F is the reciprocating slide, with a pair of push-pawls, *a a'*, for operating the dropping-wheel. The slide-lever F moves in a groove in the bottom board, B, and the shaft or bolt *f*, on which the wheel C is pivoted, extends through a longitudinal slot, *g*, in the slide, as seen in Figs. 2 and 5. The pawls *a a'* are pivoted to the slide, one on each side of the center, in reverse positions, their engaging ends pointing toward each other and operating against the teeth *e* upon opposite sides, which are formed on the under side of the wheel C or upon a separate disk attached to the under side thereof. These pawls differ from those shown in my patent before referred to, not only in their position and construction, but also in dispensing with the use of a spring to press their engaging ends against the teeth of the wheel, an inclined or curved block, *d*, (seen in dotted lines, Fig. 1,) being used to guide and hold the pawls against the teeth. This block throws the pawls inward as the slide is operated, so that their ends engage with the teeth *e*. When the slide F is moved in one direction, so that the pawl *a* turns the wheel C, the other pawl, *a'*, by its block *d*, is thrown inward, so that at the return-stroke the pawl *a'* will turn the wheel, while the pawl *a*, by its block *d*, is thrown inward in the same manner, to be ready for the next forward movement again. By this means I dispense with the use of springs, which are always liable to get out of order. As the wheel C is rotated by each thrust of the slide F from one seed-cell to another, a check-block or stop, *h*, on the slide (see Figs. 1, 3, and 5) enters the recess *i'* in the periphery of the wheel. This stop arrests the motion of the wheel C at the proper time and insures the registering of each seed-cell successively over the discharge-hole at the end of each movement of the slide.

In the top board, A, is hinged or pivoted a cut-off, J, the inner end of which is inclosed in a casing or shield, K, and its outer end located over the dropping-port. This cut-off is operated by a spring, *i*, on which the curved inner end of the cut-off rests, and which presses upward against it, thereby throwing down the outer end directly over each seed-cell in the wheel C as it successively arrives at the point over the discharge-hole in the bottom board, B, under the cut-off. The cut-off, being thus yielding, will prevent any injury to the grain, and also prevent more than the desired amount to be dropped at a time.

I claim as my invention—

1. In a seed-dropper, the combination, with a rotary seed-disk pivoted upon a shaft, of a slide having a longitudinal slot, through which the shaft of the disk extends, whereby the slide may have a line movement diametrically across the center bearing of the seed-disk, for the purpose set forth.

2. In a seed-dropper, the combination, with a seed-disk having a central pivot, of a reciprocating slide adapted to be operated across the center and under the seed-disk, and provided with a longitudinal slot, through which the pivot of the disk extends, and a pair of reversed pawls, pivoted to the slide and adapted to alternately engage with teeth on a disk and push it from opposite sides at each thrust of said slide.

3. In a seed-dropper, a rotary seed-disk, centrally pivoted, and a disk provided with teeth connected therewith, in combination with a reciprocating slide having push-pawls attached thereto, one on each side of the center, whereby the driving end of each pawl shall push against said teeth in operating the device.

4. In a seed-dropper, a rotary seed-disk, centrally pivoted, and a disk provided with teeth connected therewith, in combination with reversed push-pawls, pivoted to a slide having a reciprocating movement across the center of the dropping-disk, and which engage with the teeth of the disk.

5. In a seed-dropper having a rotary seed-disk operated by a pair of reversed push-pawls pivoted to the slide, the combination of a block or stop on said slide, on either side of the disk, to arrest the movement of the same at the point of discharge through the dropping port.

6. The combination, with a slide provided with pawls for operating a rotary seed-disk and check-blocks for stopping the rotation at the end of the stroke, of a disk provided with recesses, with which said blocks engage to prevent the disk from turning past the dropping-port.

7. In a rotary seed-dropper, the combination, with a seed-disk, of a reciprocating slide having a central opening therein and driving-pawls on either side of the same, which pawls engage with teeth upon a disk for the purpose of rotating the same.

8. In a seed-dropper, the combination, with a rotary seed-disk, of a reciprocating slide working in a groove, and of pawls attached to the slide and operating the seed-disk, as described.

9. In a seed-dropper, the combination, with a rotary seed-disk having a circle of holes therein, of a yielding or flexible cut-off, pivoted at its center, and of a shield or casing, located as shown, for protecting the spring inclosed therein.

FRANK W. YOUNG.

Attest:
ANGELO NOCE,
JOHN MCCORMICK.